United States Patent [19]

Kusano

[11] Patent Number: 5,258,192
[45] Date of Patent: Nov. 2, 1993

[54] PRESERVATIVE AUXILIARY MATERIAL FOR FOOD

[76] Inventor: Keigo Kusano, 1997-3 Suya, Nishigoushi-machi, Kikuchi-gun, Kumamoto-ken, Japan

[21] Appl. No.: 27,476

[22] Filed: Mar. 8, 1993

Related U.S. Application Data

[63] Continuation of Ser. No. 754,637, Sep. 4, 1991.

[51] Int. Cl.$^5$ .......................... A21D 85/00; A21D 4/00
[52] U.S. Cl. ..................................... 426/133; 426/321; 426/654
[58] Field of Search ......................... 426/133, 321, 654

[56] References Cited

U.S. PATENT DOCUMENTS 4,925,697  5/1990  Slimak ................................. 426/637

*Primary Examiner*—John W. Rollins
*Attorney, Agent, or Firm*—Lowe, Price, LeBlanc & Becker

[57] ABSTRACT

This invention aims at providing an auxiliary material having a high preservative effect, whereby the deterioration due to oxidation and putrefaction caused by molds (i.e., the most serious problems relating to the qualities of foods) can be effectively prevented without using any chemically synthetic substances such as preservatives or antioxidants. Thus the gist of the present invention resides in a preservative auxiliary material obtained by treating white sweet potato (Simon) with a synergist followed by drying.

12 Claims, No Drawings

PRESERVATIVE AUXILIARY MATERIAL FOR FOOD

This is a continuation of application Ser. No. 07/754,637, filed Sep. 4, 1991 and the benefits of 35 USC 120 are claimed relative to it.

BACKGROUND OF THE INVENTION

1. Field of the Invention

This invention relates to a preservative auxiliary material for foods, etc., comprising white sweet potato (Simon). More particularly, it relates to an auxiliary material applicable to the whole range of foods as well as to animal feeds which can substantially improve the keeping qualities of a product when used together with a main material.

2. Description of the Prior Art

Foods are denatured in various manners since the production thereof till the intake thereof by consumers. There are a number of factors causing such denaturation, for example, microorganisms, oxidation with oxygen, autolysis with enzymes, biological actions, chemical reactions among ingredients, dissipation of ingredients and physicochemical changes of ingredients. The denaturation is caused not by a single factor, from among the above-mentioned ones, but by two or more factors tangled together. In the preservation of foods, putrefaction caused by microorganisms (i.e., "molds") and deterioration due to oxidation generally bring about the most serious problems.

It is difficult, in the case of some foods, to provide a effective means for preventing the putrefaction. Thus the deterioration caused by molds can be prevented in only limited cases wherein treatments including canning, freezing, drying and heating are available.

Regarding the deterioration due to oxidation, it is hard to state that there have been established techniques which are effective in practice. This is because the permeation of a gas such as oxygen in the form of molecules can be hardly inhibited, even once removed, as compared with microorganisms the invasion of which can be completely prevented.

The deterioration due to oxidation, which is a serious problem in foods, is caused by the oxidation of lipids contained in foods. Foods, in particular, vegetable foods generally contain little lipids. However the lipids contained in vegetable foods comprise unsaturated fatty acids which are liable to undergo oxidation and, as a result, rancidification. When the chain oxidation proceeds, furthermore, ingredients such as ascorbic acid, colorants and odor components are denatured and rancidified, thus bringing about various disadvantages. When a food is oxidized, therefore, several problems including the evolution of an offensive odor, an increase in viscosity and a color change will be observed.

In order to prevent the growth of molds or the oxidation of lipids, there have been widely employed microbicides or preservatives and antioxidants. However most of these agents are organic compounds which are not harmless to human body. Thus it has been pointed out that they might cause internal organ diseases and exert other adverse effects on the human body. In particular, some of these compounds are carcinogenic or teratogenic and thus tolerances therefor have been specified. However the continuous use of such agents might have bad influences (for example, residence in the human body), even though they are used in an amount below the tolerant level. Accordingly it is desirable not only for man but also for livestock to avoid unnecessary intake of these agents.

The white sweet potato (Simon) to be used as the starting material in the present invention is the foundation stock of potatoes. It was once used as a nostrum by Amerinds in Central and South America. Later this plant was improved and then named Simon after the discoverer thereof. It was introduced into Japan recently and cultivated. It has been confirmed so far that Simon contains vitamins A, $B_1$, $B_2$, $B_6$, C, E, P and K, nicotinic acid, pantothenic acid, porphyrin, folic acid, chlorophyll, calcium, potassium, iron, magnesium, etc. Although it is highly nutritious, it is inferior to common sweet potato in starch content and sugar content. Thus it has not been fully utilized but rather allowed to stand hitherto.

However the present inventor's efforts have made the white sweet potato available as a material of sake (refer to Japanese Patent No. 1516489). The white sweet potato can be grown not only in fields but also in non-cultivated paddy fields by extensive cultivation. Further, it is highly fertile and shows an elevated yield potential, since not only the tuberous root but also the foliage can be utilized. Thus there is a good possibility that the white sweet potato can substitute for rice. Furthermore, the exploitation of the usefulness of the white sweet potato which is highly nutritious may be useful for farmers.

BRIEF SUMMARY OF THE INVENTION

Under these circumstances, it is an object of the present invention to provide a preservative auxiliary material, whereby the deterioration of lipids due to oxidation and putrefaction caused by molds (i.e., the problems most closely relating to the qualities of foods) can be effectively prevented by taking advantage of a natural substance which has been regarded as harmless but not fully utilized and making efficient use of the contents of said substance, without using any chemically synthesized products such as preservatives or antioxidants. Thus the gist of the present invention resides in a preservative auxiliary material for foods, etc., obtained by treating white sweet potato (Simon) with a synergist, followed by drying.

DESCRIPTION OF THE PREFERRED EMBODIMENTS

It is to be understood that the term "foods" as used herein widely involves products mainly comprising wheat or other cereals (for example, bread, confectioneries, cereal foods and noodles), tofu and processed tofu products, seasonings (for example, soy sauce and miso), liquors, distilled liquors, ham and sausage prepared from livestock meat, ground fish meat and fish paste products (for example, kamaboko and satsuma-age) prepared from fish meat, as well as animal feeds for livestock and fish. Thus the auxiliary material according to the present invention is a concept forming a counterpart to the main material of foods, etc., over a wide range.

Although the white sweet potato (Simon) to be used in the present invention contains starch and sugar each in a relatively small amount, it is rich in vitamins A, $B_1$, $B_2$, $B_6$, C, E, P and K, nicotinic acid, pantothenic acid, porphyrin, folic acid, chlorophyll, calcium, potassium, iron, magnesium, etc.

As will be described hereinafter, the white sweet potato (Simon) has excellent antioxidant, preservative and antimicrobial effects when used together with a synergist. It is assumed, therefore, that white sweet potato (Simon) would contain some trace ingredients, which have preservative and antioxidant effects per se, or some effective trace ingredients which exert said effects synergistically with the synergist. It is further assumed that these ingredients are contained in such a proportion as to appropriately exert the above-mentioned effects together with the synergist.

The white sweet potato (Simon) includes not only the tuberous root but also the foliage. The former does not essentially differ from the latter in ingredients. The latter is characterized by containing more chlorophyll, folic acid and dietary fiber. When processed into products, the former gives a pale yellow color, whereas the latter gives a green color. The tuberous root and foliage may be used by mixing together at an appropriate ratio. When a product of a characteristic color is to be prepared, however, they may be employed separately.

For the above-mentioned purpose, white sweet potato (Simon) may be divided into the tuberous root and foliage and then thoroughly washed with water. After draining with a dehydrator, the tuberous root is cut into pieces of 5 to 6 mm, while the foliage is cut into pieces of 2 to 3 cm for use.

In the present invention, the white sweet potato (Simon) is treated with a synergist. The term "synergist" as used herein means an agent which has an antioxidant action or a highly limited antioxidant action per se but can significantly enhance the antioxidant effect of an antioxidant when employed together therewith. Particular examples thereof include citric, tartaric, ascorbic and other organic acids. In the present invention either one of these materials or a mixture thereof may be used in the form of a solution. Distilled water is preferable as the solvent. It is further effective to add honey to the synergist.

Examples of antioxidants occurring in nature include tocopherol, β-carotene and ascorbic acid. In fact, white sweet potato (Simon) contains tocopherol, β-carotene and ascorbic acid. Thus it is a matter of course that the antioxidant effect of white sweet potato (Simon) can be expected when used together with a synergist.

In the present invention, however, not only the excellent antioxidant effect but also excellent preservative and microbicidal effects are achieved. Therefore it is assumed that white sweet potato (Simon) contains some effective trace ingredients which have a microbicidal effect per se and can exert an enhanced antioxidant effect upon interaction with the synergist, in addition to the above-mentioned antioxidant ingredients.

The treatment with the synergist may be effected as follows. The white sweet potato (Simon) is cut into an appropriate size and dried. Then the synergist is directly sprinkled over it. Alternately, the white sweet potato (Simon) is immersed in the synergist in a tank or the synergist is sprayed on the white sweet potato (Simon). Thus the synergist is well blended with the white sweet potato (Simon). It is preferable that the white sweet potato (Simon) is dried and milled with, for example, a mill and then the synergist is sprayed on the obtained powder. The white sweet potato (Simon) may be dried by sun-drying, heating or freeze-drying.

Furthermore, it is preferable to repeatedly spray the synergist on the white sweet potato (Simon). It is recommended, for example, that the drying and milling of the white sweet potato (Simon) and the spraying of the synergist thereon are repeated twice or more and the particle size of the powder is reduced in each procedure.

The above-mentioned auxiliary material may be mainly used in foods. Further, it may be used in livestock feeds or fish feeds in some cases. When employed in a livestock feed, the white sweet potato (Simon) may be formulated not into a powder but into an appropriate form (for example, granules) so as to give an auxiliary material for livestock feeds which can be easily taken by animals.

When the preservative auxiliary material of the present invention is added to a main material of, for example, a food, the oxidation of the obtained product and the growth of molds therein can be retarded. Thus the shelf life of the product can be prolonged two or three times as compared with a product free from the preservative auxiliary material of the present invention. Furthermore, the obtained product, wherein only the natural white sweet potato (Simon) and the synergist almost the same as natural ones are used, has a high safety and a nutritive value comparable to natural ones. Thus the nutrients of the white sweet potato (Simon) can be fully utilized.

EXAMPLE 1

Preservative Auxiliary Material of the Present Invention

White sweet potato (Simon) was divided into the tuberous root and foliage and then the preservative auxiliary material of the present invention was prepared in the following manner. The tuberous root and foliage of the white sweet potato (Simon) will be referred to as the auxiliary materials A and B, respectively.

Preparation of Auxiliary Material

White sweet potatoes (Simon) were divided into the tuberous roots and foliage. After thoroughly washing with water and draining with a dehydrator, the tuberous roots were cut into pieces of 5 to 6 mm in thickness while the foliage were cut into pieces of approximately 2 to 3 cm in length, followed by freeze-drying. Next, a synergist solution as specified in Table 1 was sprayed thereon to thereby moisten the tuberous roots and foliage. After freeze-drying, the tuberous roots and foliage were ground with a mill to thereby give about 20-mesh coarse grains. These coarse grains were further moistened by spraying the synergist solution. After freeze-drying, these grains were ground with the mill to thereby give 200-mesh fine grains. The moistening, drying and grinding were repeated once more. After pasteurizing at 180° to 220° C., the auxiliary materials A and B were obtained.

TABLE 1

| Composition of synergist (per 100 g) | |
|---|---|
| Component | Content (% by weight) |
| citric acid | 6–7 |
| tartaric acid | 1.0–1.5 |
| malic acid | 2.0–2.5 |
| other organic acids | 0.5 |
| honey | 8–10 |

The above composition was dissolved in distilled water to thereby give the synergist solution.

EXAMPLE 2

White Bread

By using the auxiliary materials obtained above, white bread was produced in the following manner. The dough method was employed.

First, 700 g of hard wheat flour, 300 g of semi-hard wheat flour and 100 g of the auxiliary material A of the present invention were mixed together and then sieved. 20 g of baker's yeast was dissolved in mashing water (35° C.) at a concentration of approximately 20 %. Further, sugar and common salt were dissolved in mashing water (36° C.) at a concentration of approximately 50%.

Next, mashing was performed by feeding the aqueous solution of sugar and common salt to a mixer and then adding 700 g of wheat flour (containing the auxiliary material A) and the yeast solution thereto, followed by mixing. To the obtained mixture were slowly added the residual wheat flour (500 g) and approximately 30% of the mashing water, and the mixture was kneaded at a low speed for 3 minutes and then at a high speed for 3 minutes. Finally, 40 g of shortening was added thereto. The kneading was continued at a low speed for 2 minutes and then at a high speed for 4 minutes until the dough became smooth.

The dough thus kneaded was transferred into a fermentation tank. The surface of the dough was flattened and thinly coated with an oil. Then it was allowed to undergo fermentation in a fermentation room (room temperature: 26-27° C., humidity: 75%). After 2 hours, the dough was puffed thrice. Then it was degassed.

Subsequently, the dough was allowed to undergo the second fermentation in the fermentation room for approximately 50 minutes and then degassed in the same manner as the one described above.

The dough was divided into 450 g portions and allowed to rest in a resting box, on the bottom of which wheat flour was applied, at a temperature of 28° to 30° C. and a humidity of 75 to 85% for approximately 20 minutes. The dough thus puffed was extended, rolled and trundled so as to make into a cylindrical shape. Then it was packed in a bread mold.

The shaped dough was then rested in a proofer at a temperature of 35° to 37° C. under a humidity of 85 to 90% for approximately 60 minutes. Thus the dough was puffed to such a level as corresponding to approximately 80% of the size of the final product. Then it was baked in an oven at 180° to 190° C. for approximately 50 minutes.

After cooling for a while, the baked bread was taken out of the mold and allowed to cool until the temperature at the center reached about 30° C. Thus white bread produced by using the auxiliary material of the present invention was obtained. Two loaves of this bread were compared with two loaves of marketed white bread.

Each loaf was divided into three equal parts. Namely, six samples of each bread were obtained.

These samples were allowed to stand in a room (room temperature: approximately 25° C., humidity: approximately 80%) and the denaturation was examined. The marketed white bread, which seemingly contained a preservative, emitted an offensive odor and got moldy on the third day. On the seventh day, it was completely covered with molds and completely discolored, namely, putrefied. In contrast, the bread produced by using the auxiliary material of the present invention did not get moldy up to the seventh day. It was almost completely covered with mods on the sixteenth day. It caused neither roping nor rancidification odor till the sixth day. Thus it has been confirmed that the white bread produced by using the auxiliary material of the present invention have antimicrobial and antioxidant effects twice as high as those of the common white bread.

As the result of the comparison of the ingredients, it has been furthermore confirmed that the white bread produced by using the auxiliary material of the present invention is superior in nutritional value.

TABLE 2

Comparison of ingredients of white bread

| Ingredient | Invention white bread | Marketed white bread |
|---|---|---|
| energy | 323 Kcal | 270 Kcal |
| moisture | 27.8 g | 35.0 g |
| protein | 8.7 g | 8.0 g |
| lipid | 7.8 g | 1.5 g |
| carbohydrate | | |
| (saccharide) | 52.9 g | 54.3 g |
| (fiber) | 1.5 g | 0.3 g |
| ash | 1.3 g | 0.9 g |
| minerals | | |
| calcium | 36 mg | 11 mg |
| iron | 2.1 mg | 1.0 mg |
| sodium | 110 mg | 480 mg |
| potassium | 120 mg | 0 |
| phosphorus | 83 mg | 68 mg |
| β-carotene | 47 μg | 0 |
| vitamin A (potency) | 26 I.U | 0 |
| vitamin $B_1$ | 0.08 mg | 0.10 mg |
| vitamin $B_2$ | 0.09 mg | 0.03 mg |
| niacin | 1.9 mg | 0.7 mg |

In accordance with the composition of Table 3, white bread was produced by the sponge and dough method and the keeping qualities thereof were examined. The obtained results were the same as those of the dough method as described above.

TABLE 3

Composition employed in sponge and dough method (g)

| Raw material | Sponge mashing | Dough mashing |
|---|---|---|
| hard wheat flour | 700 | |
| semi-hard wheat flour | | 300 |
| auxiliary material B | | 100 |
| yeast | 20 | |
| common salt | | 15 |
| sugar | | 40 |
| shortening | | 40 |
| water | 390 ml | 270 ml |

EXAMPLE 3

Udon Noodles 7.5 kg of wheat flour and 2.5 kg of the auxiliary material A of the present invention prepared in Example 1 were mixed together and sieved. Then an aqueous solution of common salt was added thereto in portions while kneading the mixture in a mixer at 60 to 100 rpm for 10 minutes. The kneaded mixture was allowed to rest for a while and then kneaded again. Next, it was fed to a crude roller machine to thereby give crude noodle belts.

Two of these noodle belts were treated together with a composing machine to thereby give a noodle belt of approximately 1 cm in thickness. The obtained belt was then wound around a wooden bar and aged. Next, two noodle belts were treated together with the composing machine again to thereby give a noodle belt of 3 mm in thickness. These noodle belts were cut with a cutting roll into a length of about 2 m and then into a length of about 30 cm. Thus fresh udon noodles of the present invention were obtained.

For comparison, fresh udon noodles were produced in the same manner as the one described above except using no auxiliary material of the present invention.

Ten balls of each udon noodles were packed in polyethylene bags and allowed to stand at a room temperature of approximately 20° C. to examine the denaturation of the samples. It was found that the udon noodles of the present invention neither got moldy nor emitted any putrefaction or rancidification odor within 3 days. On the other hand, the samples free from the auxiliary material of the present invention became ropy after 24 hours, got moldy and emitted a putrefaction odor on the second day and putrefied, yellowed and entirely covered with mold on the fourth day.

Thus it has been confirmed that the fresh udon noodles of the present invention has a shelf life twice as long as that of marketed ones.

EXAMPLE 4

Tofu

Soybeans as the main material were washed with water and immersed in thrice as much water for 12 hours. To the swollen soybeans was added 20% by weight, based on the main material, of the auxiliary material B prepared in Example 1. Then the mixture was ground in a grinder while adding water in an amount twice as much as the main material. Further, water was added to thereby make the total volume 10 times as much as the raw materials. After adding a defoaming agent, the mixture was heated in a cooking pot up to 100° C. within 5 minutes and then maintained at this temperature for approximately 4 minutes. Then it was pressed and divided into soy milk and tofu cake. The tofu cake was boiled in the cooking pot for 2 to 3 minutes, pressed again and then added to the above soy milk. When the temperature of the soy milk reached 75° C., a solidifying agent, which had been preliminarily dissolved in warm water, in an amount of 3% by weight of the soybeans was added thereto. By reversing paddles after stirring 7 or 8 times, the soy milk was allowed to stand for approximately 10 minutes. The tofuyu at the upper part was separated and the solidified matter at the lower part was pressed by successively placing a bamboo screen, a board and a weight stone thereon for 30 minutes. During the pressing procedure, the shape of the tofu was dressed. Then the tofu was taken out in a water tank and cooled. After cutting into an appropriate size for marketing, a tofu product was obtained. Table 4 shows the comparison of this product with a marketed one.

TABLE 4

| Ingredient | Comparison of ingredients of tofu | |
|---|---|---|
| | Tofu of invention | Marketed tofu |
| moisture | 86.0 g | 86.8 g |
| protein | 6.7 g | 6.8 g |
| lipid | 3.3 g | 5.0 g |
| saccharide | 1.2 g | 0.8 g |
| fiber | 1.5 g | 0 |
| ash | 1.3 g | 0.6 g |
| calcium | 240 mg | 120 mg |
| phosphorus | 83 mg | 85 mg |
| iron | 8 mg | 1.4 mg |
| sodium | 4 mg | 3 mg |

TABLE 4-continued

| Ingredient | Comparison of ingredients of tofu | |
|---|---|---|
| | Tofu of invention | Marketed tofu |
| potassium | 220 mg | 85 mg |
| vitamin $B_1$ | 0.18 mg | 0.07 mg |
| vitamin $B_2$ | 0.26 mg | 0.03 mg |
| niacin | 1.5 mg | 0.1 mg |

The tofu produced by using the auxiliary material B of the present invention had a dense texture and a green color and was soft to the touch in the mouth. The keeping qualities of the invention product and the marketed one were examined in the following manner. Ten samples of each product were separately introduced together with water into polyethylene containers. Then they were allowed to stand at a room temperature of 22 C. As a result, the marketed product emitted an offensive odor and its surface turned yellow, thus becoming uneatable, on the second day. On the other hand, the invention product was not discolored up to the fifth day. Thus it has been confirmed that the tofu product of the present invention has a shelf life twice as long as the one free from the auxiliary material of the present invention.

EXAMPLE 5

Sausage

When salted cattle meat as the main material was kneaded together with other components in the production of a sausage, 5% of the auxiliary material A of the present invention was added to thereby give a sausage of the present invention.

The sausage of the present invention and a marketed one (stipulated to be kept at 10° C.) were allowed to stand in a room at a temperature of 20° C. to thereby examine the keeping qualities of them. As a result, the marketed sausage was putrefied and became uneatable within 7 days, whereas the invention one remained eatable within 18 days. Thus the sausage of the present invention has a shelf life twice or more as long as the marketed one.

Similar effects were observed in the case of hamburger products.

EXAMPLE 6

Kamaboko

In the production of kamaboko, 10%, based on the fish meat as the main material, of the auxiliary material A was added. The materials were subjected to preliminary grinding in an attritor. After adding common salt thereto, the mixture was subjected to coarse grinding. Further, other components and seasonings were added thereto and the mixture was subjected to main grinding for approximately 50 minutes. Thus a ground fish meat which was the starting material for kamaboko was obtained. Subsequently a kamaboko product of the present invention was produced in a conventional manner.

The keeping qualities of the kamaboko product of the present invention thus obtained were compared with those of a marketed one. The results are as follows.

Five samples of each of the kamaboko product of the present invention and the marketed product were allowed to stand in a room at a temperature of 22° C. The marketed kamaboko product became ropy within 24 to 30 hours and became uneatable within 40 hours. On the other hand, the invention product showed no change in flavor and taste after 75 hours. Thus it has been confirmed that the shelf life of the invention product is twice or more as long as that of the marketed one.

EXAMPLE 7

Miso

Soybeans, which were the main material for brewing miso, were cooked, extended and then allowed to cool to 35° C. Next, 20% by weight, based on the soybeans, of the auxiliary material A was dusted thereon and mixed. After adding mold rice and common salt thereto, pitching miso was further added thereto and the mixture was well stirred. After grinding by passing through a miso-chopper, the mixture was introduced into a mashing tank for brewing and pressed in such a manner that no void was formed. After coating the surface with salt, a weight stone (approximately 20% of the weight of the fed materials) was placed thereon in such a manner that the weight was shared equally. Then it was aged by allowing to stand in a dark cold place. In the above step, roasted salt was used in an amount corresponding to approximately 80% of the common level.

The miso product of the present invention thus obtained was compared with a marketed one. The results are as follows.

The miso product of the present invention and a marketed miso containing no preservative were allowed to stand in a room at a temperature of 25° C. to thereby examine the denaturation. As a result, the marketed one got moldy after 2 months and entirely covered with molds after 3 months. On the other hand, the invention product retained the original qualities after 3 months. Further, it suffered from no changes in smell and taste and never got moldy after 6 months. It has been thus confirmed that the invention product has a shelf life twice or more as long as that of the marketed one.

Table 5 shows the comparison of the ingredients.

TABLE 5

Comparison of ingredients of invention and marketed miso products (per 100 g of sample)

| Ingredient | Invention miso | Marketed miso |
| --- | --- | --- |
| energy | 198 kcal | 178 kcal |
| moisture | 46.5 g | 49.0 g |
| protein | 12.4 g | 10.0 g |
| lipid | 5.0 g | 1.7 g |
| carbohydrate | | |
| (saccharide) | 19.6 g | 30.8 g |
| (fiber) | 3.5 g | 1.0 g |
| ash | 13.0 g | 7.5 g |
| calcium | 196 mg | 70 mg |
| sodium | 920 mg | 2400 mg |
| phosphorus | 180 mg | 120 mg |
| iron | 8.6 mg | 3.0 mg |
| vitamin A (potency) | 28 IU | — |
| β-carotene | 42 μg | — |
| vitamin $B_1$ | 0.12 mg | 0.05 mg |
| vitamin $B_2$ | 0.21 mg | 0.10 mg |
| nicotinic acid | 3.2 mg | 1.5 mg |
| potassium | 440 mg | 340 mg |

EXAMPLE 8

Soy sauce

In the production of soy sauce, 14% by weight, based on the main materials, of the auxiliary material A was dusted on cooked and cooled soybeans and wheat as the main materials. Next, roasted and cracked wheat was added thereto. After spraying mold starter, the mixture was uniformly stirred and then immediately fed into a koji-tray. Then it was treated in a conventional manner to thereby give a soy sauce product of the present invention.

The keeping qualities of the invention product thus obtained and a marketed soy sauce were examined. The results are as follows.

The soy sauce of the present invention and the marketed one containing no preservative were allowed to stand at room temperature. The surface of the marketed product was covered with molds within 3 months and the product was denatured within 6 months. On the other hand, the invention product never got moldy after 1 year and showed no changes in taste and flavor. Thus it has been confirmed that the soy sauce of the present invention has a shelf life twice or more as long as the marketed one.

EXAMPLE 9

Beer

In the production of beer, milled malt was introduced into a mash tank. Then protein was decomposed with protease contained in the malt at approximately 50° C. Subsequently 20% by weight, based on the malt as the main material, of the auxiliary material B was added thereto together with rice and starch gruel. Then the mixture was mashed by heating to 80° C. The mashed liquor was filtered to thereby give a transparent wort. To the obtained wort was added hop followed by boiling. After cooling to 5° C. in a sedimenting tank, brewer's yeast was added in a fermentation tank. Then the main fermentation was effected at 8° to 10° C. for approximately 10 days. After transporting to a storage tank, post-fermentation was effected at 0° to 1° C. for 1 month to thereby give a beer. The use of the auxiliary material B imparted a vivid green color to the product. The keeping qualities of the product are as follows.

Six bottles (each 633 ml) of the draught beer of the present invention and 6 bottles of a marketed beer were allowed to stand at room temperature (25° C.). The marketed beer lost the characteristic flavor and only the alcoholic taste remained therein in the fourth month. On the other hand, the beer of the present invention suffered from no changes in odor and taste and lathered well even after 10 months. Thus it has been confirmed that the invention product has a shelf life twice or more as long as that of the marketed one.

Two bottles of a marketed sake containing neither antioxidant nor preservative and 2 bottles of a sake product of the present invention were allowed to stand at room temperature to thereby examine their keeping qualities. As a result, the marketed product became turbid and denatured within 6 months, while the invention one showed no change in qualities even after 1 year. Thus it has been confirmed that the shelf life of the invention product is twice or more as long as that of the marketed one.

EXAMPLE 10

Feed

To 150 kg of a feed mainly comprising harvested alfalfa was added 30 kg of the auxiliary material B. After storing in a silo for 3 months, the feed was compared with the same amount of another one free from any auxiliary material of the present invention.

As a result, the feed free from the auxiliary material was entirely covered with molds within 3 months and emitted an offensive odor due to fermentation. On the other hand, the feed of the present invention remained in the same state as that before storing in the silo, without causing any offensive odor or the mold growth.

The effects of the feed of the present invention were examined in the following manner. Ten dairy cows were fed with 3 kg/day of said feed mixed with a common one. After continuing the feeding for 7 days, the lactation of these animals was improve as compared with those fed with the common feed only. After 2 months, the milking yields of the cows fed with the feed of the present invention exceeded, by approximately 60%, those of the cows fed with the common feed. Furthermore, the body weights of the cows fed with the feed of the present invention were increased by 20 to 30 kg and the hair gloss of these animals were evidently improved.

The white sweep potato (Simon) has the botanical name *Ipomoea batatas* Lam.

I claim:

1. The method for preserving food products which comprises adding thereto a preserving effective amount of a powdered white sweep potato having the same of *Ipomoea batatas* Lam, which sweet potato has been contacted with a synergist selected from the group consisting of citric, tartaric, ascorbic, malic and organic acids or mixtures thereof followed by drying.

2. The method of claim 1 wherein said sweet potato comprises the tuberous root of the sweet potato.

3. The method of claim 1 wherein said sweet potato comprises the foliage of the sweet potato.

4. The method of claim 1 wherein said sweep potato comprises both the tuberous root and the foliage of the sweet potato.

5. The method according to claim 1 wherein the honey is included with said synergist.

6. The method according to claim 1 wherein said synergist includes a combination of citric acid, tataric acid, ascorbic acid, malic acid and organic acids.

7. A food product with improved preservation properties comprising the unpreserved food product together with a preserving effective amount of a powdered white sweet potato having the name of *Ipomoea batatas* Lam, which sweet potato has been contacted with a synergist selected from the group consisting of citric, tartaric, ascorbic, malic and organic acids, or mixtures thereof, followed by drying.

8. The preserved food product according to claim 7 wherein said sweet potato comprises the tuberous root of said sweet potato.

9. The preserved food product of claim 7 wherein said sweet potato comprises the foliage of said sweet potato.

10. The preserved food product of claim 7 wherein said sweet potato comprises both the tuberous root and the foliage of said sweet potato.

11. The preserved food product of claim 7 which additionally includes honey.

12. The preserved food product of claim 7 wherein said synergist includes a combination of citric acid, tartaric acid, ascorbic acid, malic acid and organic acids.

* * * * *